United States Patent
Manyoky et al.

(10) Patent No.: US 7,252,471 B1
(45) Date of Patent: Aug. 7, 2007

(54) SWIVEL NUT

(75) Inventors: Lionel Istvan Manyoky, Elkhart, IN (US); Charles M. Vaughn, Granger, IN (US)

(73) Assignee: Dexter Axel Company, Elkhart, IN (US)

( * ) Notice: Subject to any disclaimer, the term of this patent is extended or adjusted under 35 U.S.C. 154(b) by 0 days.

(21) Appl. No.: 11/524,617

(22) Filed: Sep. 21, 2006

(51) Int. Cl.
*F16B 43/00* (2006.01)

(52) U.S. Cl. ............... 411/533; 411/427; 411/432

(58) Field of Classification Search ........... 411/533, 411/427, 432
See application file for complete search history.

(56) References Cited

U.S. PATENT DOCUMENTS

| | | | | |
|---|---|---|---|---|
| 3,030,996 A | * | 4/1962 | Doerr | 411/270 |
| 5,584,628 A | * | 12/1996 | Bernoni | 411/84 |
| 5,597,279 A | | 1/1997 | Thomas et al. | 411/432 |
| 5,688,091 A | | 11/1997 | McKinlay | 411/149 |
| 6,039,524 A | | 3/2000 | McKinlay | 411/149 |
| 6,106,077 A | | 8/2000 | Kluge et al. | 301/35.62 |
| 6,435,791 B1 | * | 8/2002 | Bydalek | 411/428 |
| 6,517,301 B2 | | 2/2003 | Hartmann et al. | 411/136 |
| 6,592,314 B1 | | 7/2003 | Wilson | 411/429 |

* cited by examiner

*Primary Examiner*—J J Swann
(74) *Attorney, Agent, or Firm*—J. A. Thurnau, Esq.; C. H. Castleman, Esq.; J. L. Mahurin, Esq.

(57) ABSTRACT

A swivel nut comprising a body (10) having a threaded bore (130), the body comprising a ridge (11) which circumferentially extends about an outer surface, the body further comprising a first surface (12) which extends normal to a body bore centerline (CL), a tapered member (20) having a tapered surface (22) and a bore (23), the tapered member further comprising a second surface (23) which extends normal to the body bore centerline and which second surface cooperatively engages the first surface, the tapered member comprising a groove (21) which extends about an inner surface, and the groove cooperating with the ridge to connect the body and the tapered member while allowing the tapered member rotational movement with respect to the body.

4 Claims, 2 Drawing Sheets

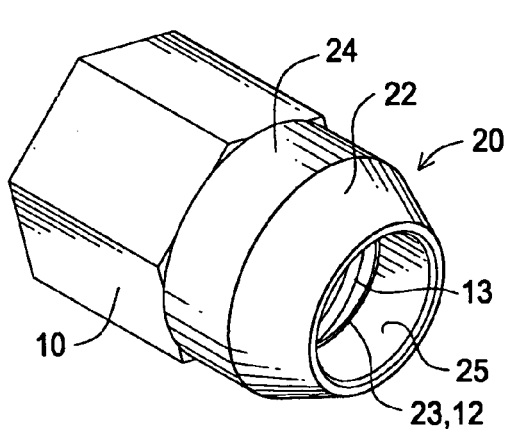
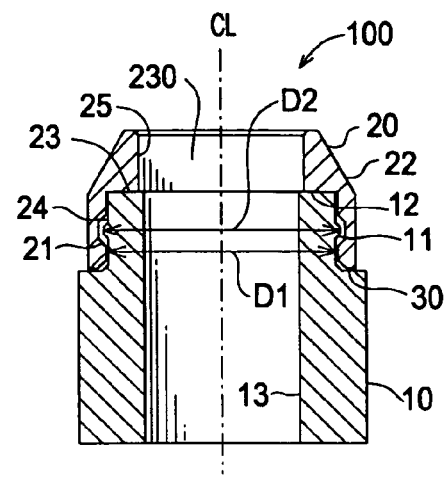
FIG.2  FIG.1
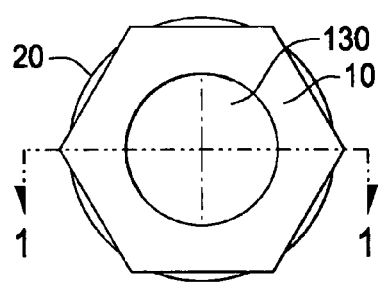
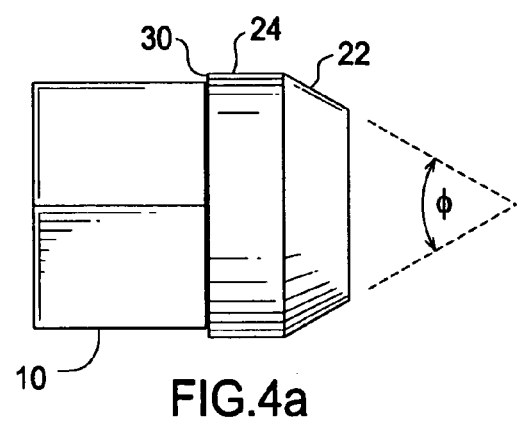
FIG.3  FIG.4a
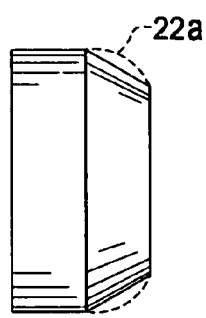
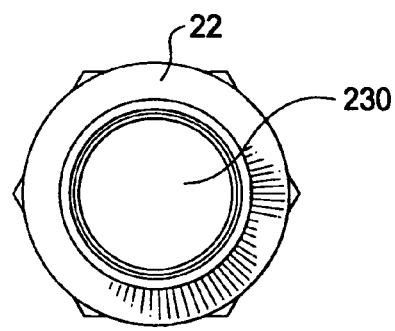
FIG.4b  FIG.5

SWIVEL NUT

FIELD OF THE INVENTION

The invention relates to a swivel nut, and more particularly, to a swivel nut having a ridge and groove snap-on torque cone.

BACKGROUND OF THE INVENTION

A common problem encountered by freight haul tractor trailers, as well as smaller trailers used for non-commercial purposes such as recreational trailers, is the loosening of the lug nuts on the wheels of the trailer.

A common problem results from methods used to secure nuts to lug bolts on new truck and trailer wheels. Unless properly addressed "seating-in" during initial use can result in a reduction of the clamp force, and thereby the torque, which holds the wheel to the axle hub. This can over time create a gap between the nut and the wheel which enables the initially tight nuts to loosen up.

Further, the stacking of components on a vehicle wheel hub creates a cumulative thickness of the stacked parts. The initial torque can force the material of the stacked components to yield, thereby allowing the nuts to loosen by "bleeding off" the initial torque and preload, again, causing the nut to loosen.

Loss of torque can also occur as a result of long storage periods where the wheel assembly is subjected to repeated cycles of heating and cooling.

Once the nuts have loosened, the wheel is able to rock and wobble back and forth on the lug bolts. After a period of time, the lug hole diameter in the wheel can be significantly enlarged, damaging the wheel as well as severely degrading the stability of the trailer, rending it uncontrollable. Also, relative movement of the wheel can result in fatigue failure of the lug bolts, causing catastrophic separation of the wheel from the axle hub. For example, in an emergency or panic stop, once loosened under hard application of the brakes the wheel can shear off the lug bolts, thus rendering the trailer or vehicle uncontrollable. Once detached the wheel can become a dangerous projectile as well, capable of seriously injuring others.

This situation can be further aggravated by the accumulation of debris on the various engaged, load bearing surfaces of the lug nut system.

Representative of the art is U.S. Pat. No. 6,592,314 which discloses a wheel nut and washer assembly for securing a wheel to a motor vehicle axle. The wheel nut includes a body having a longitudinal axis, the nut body also having an axial threaded aperture and a pair of ends, one end being in the form of a smooth steel external surface. The wheel nut also includes a steel washer having an end terminating in a smooth annular surface in surface-to-surface engagement with the body end thereby maintaining axially alignment of the body and washer enabling relative movement of said body and washer about said axis. A decorative cap on the assembly is configured so that it holds the washer on the nut, a gap between the cap and washer to enable the washer to freely rotate and move laterally relative to the nut.

What is needed is a swivel nut having a ridge and groove snap-on torque cone. The present invention meets this need.

SUMMARY OF THE INVENTION

The primary aspect of the invention is to provide a swivel nut having a ridge and groove snap-on torque cone.

Other aspects of the invention will be pointed out or made obvious by the following description of the invention and the accompanying drawings.

The invention comprises a swivel nut comprising a body having a threaded bore, the body comprising a ridge which circumferentially extends about an outer surface, the body further comprising a first surface which extends normal to a body bore centerline, a tapered member having a tapered surface and a bore, the tapered member further comprising a second surface which extends normal to the body bore centerline and which second surface cooperatively engages the first surface, the tapered member comprising a groove which extends about an inner surface, and the groove cooperating with the ridge to connect the body and the tapered member while allowing the tapered member rotational movement with respect to the body.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a cross-sectional view of the swivel nut.
FIG. 2 is a perspective view of the swivel nut.
FIG. 3 is an end view of the swivel nut.
FIG. 4A is a side plan view of the swivel nut.
FIG. 4B is a side plan view of an alternate embodiment.
FIG. 5 is an end view of the swivel nut.

DETAILED DESCRIPTION OF THE PREFERRED EMBODIMENT

Figure 7:
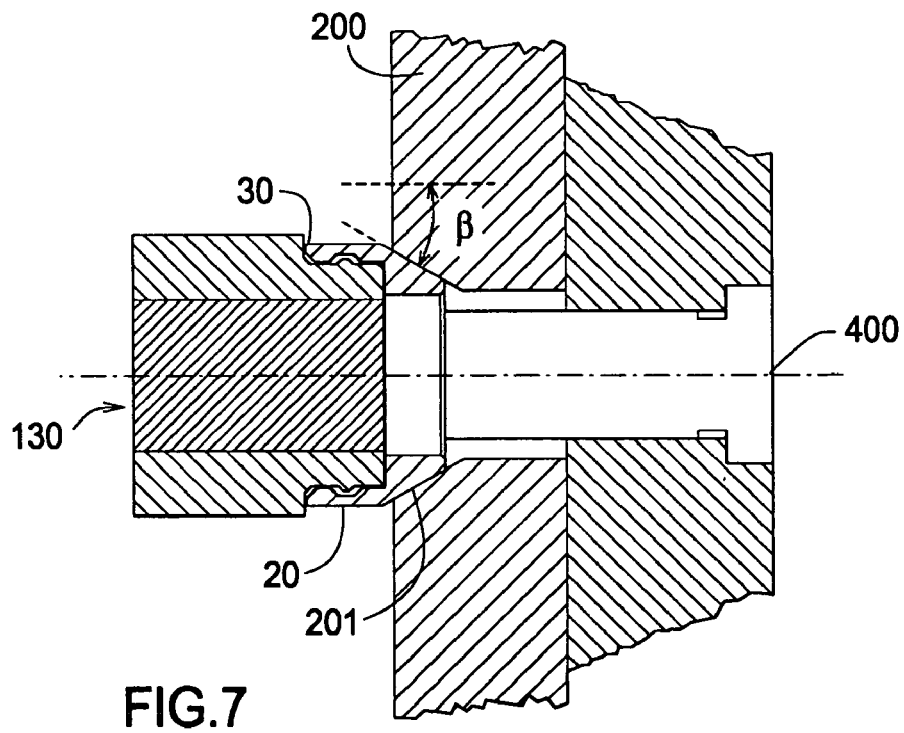
FIG. 7 is a cross sectional view of an alternate embodiment.

FIG. 1 is a cross-sectional view of the swivel nut. Swivel nut 100 comprises nut 10 and torque cone 20. Nut 10 comprises hexagonal flanges for engaging a known tool such as a wrench, ratchet or wheel socket.

Torque cone 20 and nut 10 are engaged by a ridge 11 on the nut 10 and a groove 21 which in combination comprises the torque cone snap-on feature. Groove 21 is disposed on an inner surface circumference of skirt 24. The diameter of groove 21 is selected according to the thickness of the skirt 24. Skirt 24 has an inner diameter (D1).

Ridge 11 is disposed on an outer surface circumference of nut 10 and has a diameter (D2). Ridge 11 diameter (D2) is of a sufficient magnitude to fully engage groove 21, thereby preventing torque cone 20 from separating from nut 10 once joined. However, at the same time the engagement between ridge 11 and groove 21 has clearance sufficient to allow some movement and free rotation of torque cone 20 about nut 10. Hence diameter (D2) is slightly greater than diameter (D1) in order to achieve an interference fit only during installation which requires skirt 24 to be slightly expanded when nut (body) 10 and the torque cone 20 (tapered member) are connected or "snapped" together. The ridge and groove do not otherwise contribute to torque transmission.

Torque cone surface 23 engages nut surface 12. Surfaces 23, 12 extend substantially normal to a bore centerline CL of the nut 10. Gap 30 between cone 20 and nut 10 assures clearance so that the clamping force is only exerted through surfaces 23, 12. Surfaces 23, 12 are only subjected to clamping forces having a vector that is substantially parallel to a nut centerline CL. Surfaces 23, 12 have a reduced coefficient of friction to enhance slipping between them. The materials may comprise steel, ceramic material, or a hardened coating.

Figure 6:
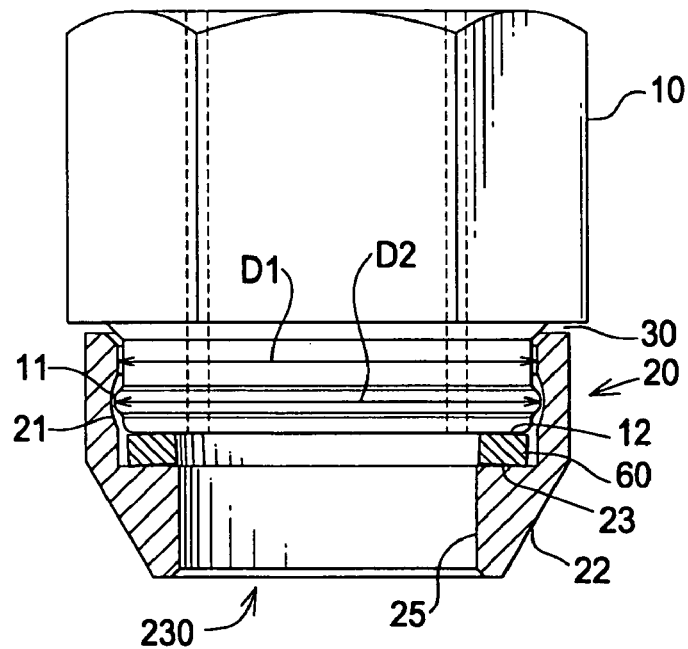
FIG. 6 is a cross-sectional view of the swivel nut installed on a wheel hub.

An internal bore 13 of nut 10 is threaded to engage a threaded stud 400 (see FIG. 6). Stud 400 is a component of a vehicle wheel hub, such as on a trailer axle. However, it should be noted that the inventive swivel nut may be used in any threaded application.

Surface 22 of torque cone 20 comprises a cone angle α thereby giving a taper to properly engage a wheel flange hole 201, see FIG. 6. Cone angle α may be in the range of approximately 60° to approximately 90°, see FIG. 4. The preferred cone angle is approximately 60°. Wheel flange hole 201 has a nut seat angle β which cooperates with surface 22 (see FIG. 6). Swivel surface 22 self aligns with a wheel flange hole 201 during use.

Bore 230 concentrically engages stud 400. Bore 230 has a slightly larger diameter than nut bore 13 since bore 230 is not threaded and does not contact the stud as a feature of operation.

A preload (L) is the desired design preload in the stud. The desired stud preload (L) is achieved by application of the installation torque on the nut 10. Selection of the proper stud preload assures proper service for the swivel nut 10 and ultimate retention of the wheel on a hub.

Use of the torque cone 20 compensates for the effects of nut 10 being loosened during operation. The torque cone maintains the proper preload on the stud or bolt if the components yield or are otherwise misaligned through use. This is primarily due to the flat surfaces 23, 12 and the substantially normal position of the surfaces with respect to the nut centerline. This arrangement provides that the force generated by the nut torque acts normally to the torque cone surface 23 thereby assuring optimum claiming force. During installation the torque cone 20 does not rotate in wheel hole 201. Only nut 10 rotates with respect to torque cone 20 as nut 10 is torqued on stud 400. Surface 23 slides upon surface 12 during installation as nut 10 is turned.

The following table is offered to illustrate a range of approximate torque values that are based upon the diameter of the stud 400. These figures are only offered by way of example and are not intended to limit the range of applications for the inventive swivel nut.

| Stud Diameter | Torque Range |
| --- | --- |
| ½" | ~60 to 120 ft/lbs |
| 9/16" | ~90 to 170 ft/lbs |
| ⅝" | ~190 to 325 ft/lbs |

In an example system, a set of swivel nuts are each torqued down on a ½" stud (400) to mount a wheel (200) on a trailer hub (300). The number of studs/swivel nuts utilized per wheel can include any appropriate number including but not limited to 4, 5, 6, or 8. The torque in this example situation is approximately 120 ft/lbs and the clamp force between each swivel nut and the hub in this example is approximately 15,000 pounds. The proper clamp force prevents the wheel from moving on the hub during operation. If the clamp force is too low the wheel will move causing a periodic bending moment to be imposed on the studs. The periodic bending moment will ultimately cause the studs to fail.

The desirable characteristic of the swivel nut has the effect of enhancing and maintaining the proper clamping force between the swivel nut and the wheel. The clamping force assures that the load on each stud 400 is a tensile load acting axially instead of a periodic bending moment which can cause premature failure of the stud.

During installation only nut 10 is rotated about stud 400. Torque cone 20 does not rotate with respect to stud 400 or wheel 200, see FIG. 6. Surfaces 23 and 12 slide upon each other as nut 10 is torqued down. Since the forces acting on surfaces 12, 23 are substantially normal to surfaces 12, 23, the frictional force generated is substantially less than in the case of a prior art nut wherein a tapered surface engaged with a wheel is moved by rotation. In turn, a greater percentage of the torque applied to the inventive swivel nut during installation goes into preloading stud 400 instead of being used to overcome friction between a nut tapered surface and the wheel or between the nut threads and the stud threads. This in turn results in a significantly greater clamp force being applied to the wheel since the stud preload is greater for a relatively lesser torque.

FIG. 2 is a perspective view of the swivel nut. Torque cone 20 is coaxially engaged with nut 10. Surface 13 is threaded to engage a stud (not shown). Only nut surface 13 threadably engages stud 400. Surface 25 is not threaded and has a diameter that exceeds the diameter of surface 13.

FIG. 3 is an end view of the swivel nut. Bore 130 extends through nut 10.

FIG. 4A is a side plan view of the swivel nut. Gap 30 is disposed between torque cone 20 and nut 10 to assure that the clamping force is only transmitted through the engagement of surfaces 23, 12.

FIG. 4B is a side plan view of an alternate embodiment. In this alternate embodiment surface 22a is arcuate to form a convex surface that engages a cooperating surface in a wheel hole.

FIG. 5 is an end view of the swivel nut. Bore 230 extends through torque cone 20. Bore 230 is coaxially aligned with bore 130.

FIG. 6 is a cross-sectional view of the swivel nut installed on a wheel hub. Swivel nut 10 is threaded onto threaded stud 400. Stud 400 is typically press fit into a hub 300. Hub 300 is typically attached to a vehicle or trailer axle (not shown). Wheel 200 is fastened to hub 300 by one or more swivel nuts 10. Wheel 200 comprises a wheel hole 201 which receives the swivel nut 10. Stud 400 projects through wheel hole 201.

FIG. 7 is a cross sectional view of an alternate embodiment. Belleville spring washer 60 is disposed between the nut 10 and the torque cone 20. More particularly, Belleville spring washer 60 is disposed and compressed between surface 12 and surface 23.

Belleville springs demonstrate known and predictable characteristics in compression. Proper selection allows a predetermined load, or in this case a stud preload, to be substantially constant over a significant spring deflection range. This means the nut 10 can unscrew a substantial amount during which washer 60 will deflect while maintaining a constant minimum preload on the stud 400, see FIG. 6. Further, a constant preload can be maintained for a greater deflection by stacking washers in series.

In an alternate embodiment Belleville spring washer 60 can be replaced with a flat washer. The surface coefficient of friction of a flat washer may be selected in order to minimize sliding friction between the washer and surfaces 23 and 12, thereby optimizing the stud preload for a given installation torque.

Preload L is the desired preload in the stud 400. The desired stud preload L is achieved by the installation torque on the nut 10. Selection of the proper stud preload is discussed above and assures proper service for the swivel nut 10 and retention of the wheel on a hub.

Use of the washer 60 compensates for the effects of nut 10 being loosened during operation. Washer 60 maintains the proper preload on the stud or bolt even if the nut is partially unscrewed from the stud or bolt, or if the components yield or are otherwise misaligned through use. For example, unintended partial rotation of nut 10 may occur during operation if a flat of the nut is struck by a piece of debris. Repeated strikes might otherwise loosen the nut, but the washer 60 enhances the ability of the nut to maintain proper preload on the stud or bolt, thereby assuring sufficient clamping force. Mechanical fatigue or yielding by the components may also cause torque to bleed off as well, but the ability of the nut to resist such torque bleed is substantially enhanced by use of the washer 60.

Although a form of the invention has been described herein, it will be obvious to those skilled in the art that variations may be made in the construction and relation of parts without departing from the spirit and scope of the invention described herein.

We claim:

1. A swivel nut comprising:
   a body (10) having a threaded bore (130);
   the body comprising a ridge (11) which circumferentially extends about an outer surface thereof;
   the body further comprising a first surface (12) which extends normal to a body bore centerline (CL);
   a tapered member (20) having a tapered surface (22), a skirt (24), and a bore (230);
   the tapered member further comprising a second surface (23) which extends normal to the body bore centerline and which second surface cooperatively engages the first surface;
   the ridge comprises a diameter (D2) which is greater than an inner diameter (D1) of the skirt;
   the tapered member comprising a groove (21) which extends about an inner surface of the skirt; and
   the groove engaging the ridge, whereby the body and the tapered member are connected by snap fit expansion of the skirt of the tapered member over the ridge while further allowing the tapered member rotational movement with respect to the body.

2. The swivel nut as in claim 1, wherein the tapered surface (22) further comprises an angle in the range of approximately 60° to approximately 90°.

3. The swivel nut as in claim 1, wherein the body comprises a portion for engaging a tool.

4. The swivel nut as in claim 1 further comprising a Belleville washer disposed between the first surface and the second surface.

* * * * *